United States Patent
Bentz et al.

[11] 3,910,867
[45] Oct. 7, 1975

[54] SHAPED STRUCTURES OF ACRYLONITRILE POLYMERS WITH PERMANENT ANTISTATIC PROPERTIES

[75] Inventors: Francis Bentz, Cologne; Günther Nischk, Dormagen, both of Germany

[73] Assignee: Bayer Aktiengesellschaft, Leverkusen-Bayerwerk, Germany

[22] Filed: Sept. 6, 1974

[21] Appl. No.: 503,768

[30] Foreign Application Priority Data
Sept. 15, 1973 Germany .......................... 2346566

[52] U.S. Cl.... 260/85.5 S; 260/32.6 N; 260/88.7 B; 260/77.5 AP; 260/77.5 MA; 260/553 R; 260/553 A; 260/553 C; 260/DIG. 19
[51] Int. Cl.²................................................. C08K 5/16
[58] Field of Search ... 260/32.6 N, 45.9 NC, 553 R, 260/553 A, 553 C, 85.5 S, 88.7 B, DIG. 15, DIG. 17, DIG. 19

[56] References Cited
UNITED STATES PATENTS
3,852,255  12/1974  Bentz .................... 260/32.6 N
3,856,738  12/1974  Bodesheim ............. 260/32.6 N

*Primary Examiner*—Paul R. Michl
*Attorney, Agent, or Firm*—Plumley & Tyner

[57] ABSTRACT

The invention relates to acrylonitrile polymers which contain as an antistatic additive at least one compound of the general formula

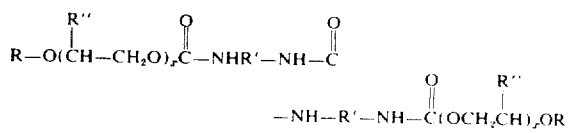

4 Claims, No Drawings

SHAPED STRUCTURES OF ACRYLONITRILE POLYMERS WITH PERMANENT ANTISTATIC PROPERTIES

This invention relates to shaped structures, in particular filaments, fibres and sheets of acrylonitrile polymers which have permanent antistatic properties, and a process for producing them.

Shaped structures of synthetic polymers, e.g. fibres of polyacrylonitrile, generally suffer from disadvantage of becoming electrostatically charged. This charging occurs when the surface resistance of the fibre is more than $10^{12}$ Ohm.

Numerous processes for reducing the electrostatic charge on shaped structures of this type have already been described in the literature, for example the electrical conductivity may be increased by treating the surface of the fibres or of the textile produced therefrom with antistatic dressings. The antistatic effect obtained in this way, however, is often not resistant to washing.

As described, for example, in German Offenlegungsschriften Nos. 1,469,913 and 1,965,631, an antistatic finish may be obtained by applying aqueous solutions of suitable substances to fibres which are in the aquagel state. Another method frequently employed for reducing the electrostatic charges on shaped structures of synthetic polymers involves the addition of polyethers or other suitable compounds to the solution or melt of these polymers before they are shaped. Most of the additives, however, have the disadvantage of not being wash-resistant.

It has already been proposed to render polyacrylonitrile fibres permanently antistatic without reducing their light fastness by adding thereto compounds obtained by reacting ethoxylated alcohols with diisocyanates.

It has now been found that compounds which contain a urea group in addition to a polyether group and two urethane groups impart an even better antistatic finish to polyacrylonitrile fibres.

It is, therefore, an object of this invention to provide shaped articles of acrylonitrile polymers which exhibit an improved antistatic behaviour.

Other objects will be evident from the description and the Examples.

These objects are accomplished by a shaped structure of an acrylonitrile polymer consisting of from 85 to 99.5%, by weight, of polyacrylonitrile or an acrylonitrile copolymer containing at least 60% of copolymerised acrylonitrile comprising as an antistatic additive from 0.5 to 15%, by weight, of a polyether diurethane urea compound of the following general formula I

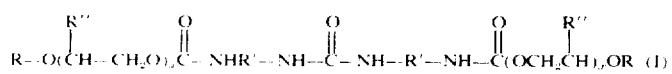

wherein
R denotes a $C_8$ - $C_{18}$-alkyl, cycloalkyl, acryl, aralkyl or alkaryl group, any of which may be substituted by halogen or alkyl;
$x$ denotes an integer of from 5 to 50;
R' denotes an alkylene, arylene, aralkylene, alkarylene or cycloalkylene group; and
R" denotes hydrogen or a methyl group.

It is still another object of the invention to provide a process for producing such shaped structures of acrylonitrile polymers with antistatic additives. This object is accomplished by a process for the production of a shaped structure of an acrylonitrile polymer with antistatic additives which comprises addition of from 0.5 to 15%, by weight, (based on the polymer mixture), of a polyether diurethane urea compound corresponding to general formula I

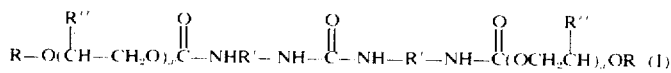

wherein
R denotes a $C_8$ - $C_{18}$-alkyl, cycloalkyl, aryl, aralkyl or alkaryl group, any of which groups may be substituted by halogen or alkyl;
$x$ denotes an integer of from 5 to 50;
R' denotes an alkylene, arylene, aralkylene, alkarylene or cycloalkylene group; and
R" denotes hydrogen or a methyl group,
to the solution of said acrylontrile polymer in an organic solvent and removal of said solvent in a shaping operation.

The polyethers used according to the invention which contain two urethane groups and one urea group have excellent compatibility with the polymers. They have very high wash resistance due to the presence of the urea group and impart excellent antistatic characteristics to the acrylonitrile polymer fibres to which they have been added.

By the term "shaped structures" is meant primarily filaments, fibres and sheets. The polyether diurethane urea compounds are preferably added in a quantity of from 2 to 10%, by weight, based on the polymer mixture. The term "acrylonitirle polymers" inlcudes, in particular, polyacrylonitrile or copolymers of acrylonitrile with (meth)acrylic acid esters, such as methyl and ethyl acrylate and methacrylate; (meth)acrylamides, e.g. (meth)acrylamide and N,N-dimethyl(meth)acrylamide; N-vinyl lactams, e.g. N-vinylpyrrolidones; vinyl esters or ethers; (meth)allyl esters; or ethers; vinyl or vinylidene halides, e.g. vinyl or vinylidene chloride and vinyl or vinylidene bromide; alkylvinyl pyridine, e.g. N-vinyl-4-methylpyridine; vinyl imidazoles; mono- or di-alkylamino alkylacrylates or methacrylates, e.g. dimethylaminoethyl (meth)acrylate or quaternized derivatives thereof; vinyl or allyl or methallylsulphonic acids; and vinyl, allyl or methallylphosphonic acids or their esters, which contain at least 60%, by weight, acrylonitrile in a copolymerised form.

To prepare the above additives, polyether monourethanes with a free isocyanate group are prepared in known manner by reacting aliphatic alcohols or phenols, such as nonan-1-ol, dodecan-1-ol, myristyl alcohol, cetyl alcohol, stearyl alcohol or i-nonyl phenol, in the melt with alkylene oxides, preferably ethylene oxide, in the presence of a basic catalyst, e.g. an alkali metal hydroxide. The reaction is preferably carried out using 1 mol of the alcohol or phenol and from 5 to 50, preferably from 10 to 35, mol of the alkylene oxide. The polyalkoxylated alcohols obtained in this way may easily be reacted with diisocyanates in a one pot process, preferably after determining the OH number. The reaction is either carried out in the absence of a solvent at a temperature of from 70° to 150°C, preferably from 90° to 130°C, or in an inert solvent, such as dimethylformamide, at similar temperatures. The molar ratio of alkoxylated alcohol to diisocyanate employed is preferably from 1:1 to 1:1.2. The reaction time is from ½ to 12 hours, preferably from 1 to 7 hours. A compound having a free isocyanate group, corresponding to the following general formula II is obtained initially,

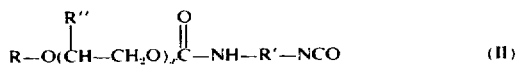
(II)

wherein

R, R', R'' and x are as defined above.

The diisocyanates used are preferably hexamethylene diisocyanate, cyclohexane-1,4-diisocyanate, 3-isocyanato-methyl-3,5,5-trimethyl-cyclohexane isocyanate, phenylene-1,3-diisocyanate, phenylene-1,4-diisocyanate, diphenylmethane-4,4'-diisocyanate and 2,2-bis-(4-isocyanatophenyl)-propane.

The urea derivative is obtained from the compounds with free isocyanate group in a one pot process by the addition of the stoichiometric quantity of water. After the addition of water, the reaction mixture is stirred for several hours at elevated temperature to complete the reaction.

The polyether diurethane ureas are added either in solid form or, preferably, in a solution of the spinning solution of the acrylonitrile polymer. It is particularly preferred to prepare the additives in dimethylformamide so that the solution of the required quantity of the resulting compounds may be added directly to the spinning solution of polyacrylonitrile.

The surface resistance of the shaped product, in particular fibres, was determined as indicated in the Examples, using a commercial high resistance Ohmmeter between the plates of two electrodes 1 cm apart at a measuring voltage of 100 V in accordance with proposed standard DIN 54 345. Before each determination, the fibres were conditioned in a standard atmosphere of 50% relative humidity at 23°C for 72 hours.

Fibres produced according to the invention have an electrical surface resistance of from $10^{10}$ to $10^{11}$ Ohm at 50% relative humidity and 23°C.

The fibres according to the invention may be dyed with the conventional dyes without their excellent antielectrostatic character being thereby diminished.

In the following Examples which are to further illustrate the invention without limiting it, parts by weight are related to parts by volume as kilogram to litre.

EXAMPLE 1 a. Preparation of

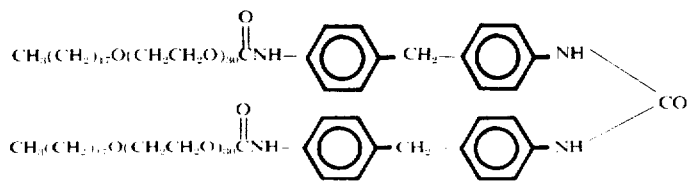

270 parts, by weight, of stearyl alcohol and 4 parts, by weight, NaOH are introduced into a three-necked flask equipped with stirrer and reflux condenser. After displacement of air in the flask with nitrogen, ethylene oxide is introduced at 100°C until a weight increase of 1320 parts, by weight is obtained. The molecular weight is found by determining the OH number. OH% = 1.06; molecular weight 1600.

This polyether is neutralised by adding 60 parts, by weight, of pure acetic acid to 1592 parts, by weight, of polyether and heating to 100°C for 1 hour. Excess acetic acid is then evaporated off under the vacuum obtainable using a water-jet at an oil bath temperature of 100°C. 250 parts, by weight, 4,4'-diphenylmethane-diisocyanate are introduced gradually at this temperature, with a small nitrogen flush. Stirring is then continued for 10 hours at from 120 to 130°C. 1300 parts, by volume, DMF are then added. 25 parts, by volume, of water are added dropwise to the resulting solution which is then stirred for 5 hours at 150°C.

b. Production and examination of polyacrylonitrile fibre. The solution from Example 1a is used to prepare a 29% dimethyl formamide solution consisting of a mixture of 90%, by weight, of an acrylonitrile copolymer (93.5% acrylonitrile, 5.5% by weight, methyl methacrylate and 1%, by weight, methacryloylaminobenzene-disulphimidebenzene) with K-value of 80 and 10%, by weight, of the polyethylene oxide diurethane urea. This solution was dry-spun at a viscosity of from 75 to 80 ball-falling-seconds at 80°C, (determined by the falling ball method by which the falling-time of a ball of V2-steel according to DIN 5401 between two markings which have a distance of 7 cm from each other is measured in a tube having an internal diameter of 3 cm and being filled with the solution to be determined). Thickness of fibre: 3.3 dtex.

The antielectrostatic effect of the additive was determined by measuring the surface resistance of the fibre at 23°C and 50% relative humidity. Sample after 10 washings: 1 33 $10^{10} \Omega$. Sample after dyeing and three wahsings: $6 \times 10^9 \Omega$.

EXAMPLE 2 a. Preparation of

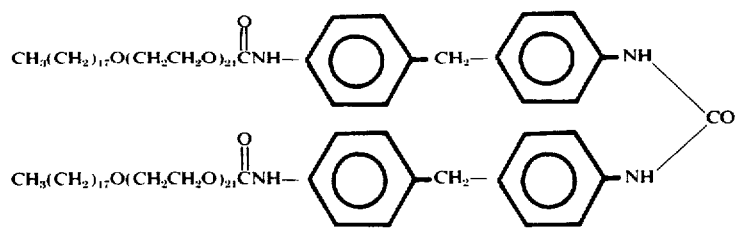

Using the method indicated in Example 1a, 270 parts, by weight, stearyl alcohol are reacted with ethylene oxide at 100°C in the presence of 4 parts, by weight, NaOH until a weight increase of 924 parts, by weight, is obtained (OH% = 1.42). After treatment with 60 parts, by weight, of pure acetic acid and removal of the excess acetic acid in a vacuum, 125 parts, by weight, 4,4'-diisocyanatodiphenyl methane are added gradually to 601 parts, by weight, of the polyether at 100°C. The reaction mixture is then stirred for 10 hours at 130°C. 1000 parts, by volume, dimethyl formamide are then added. A mixture of 50 parts, by volume, DMF and 12.5 parts, by volume, water are added dropwise to the resulting solution. The reaction mixture is then stirred for 3 hours at 140°C to complete the reaction.

b. Production and examination of polyacrylic fibre.

This solution is used to prepare a 29% dimethylformamide solution which consists 95%, by weight, of an acrylonitirle copolymer which has the composition indicated in Example 1b and a K-value of 81 and 5%, by weight, of the polyethylene oxide diurethaneurea from Example 2a. The solution (viscosity from 75 to 80 ball-falling-seconds at 80°C) was dry-spun. Thickness of fibre: 3.3 dtex.

Electrical surface resistance after 10 washings: 1 ×10$^{10}$ Ω. After dyeing and 3 washings: 6 ×10$^9$ Ω.

EXAMPLE 3 a. Preparation of

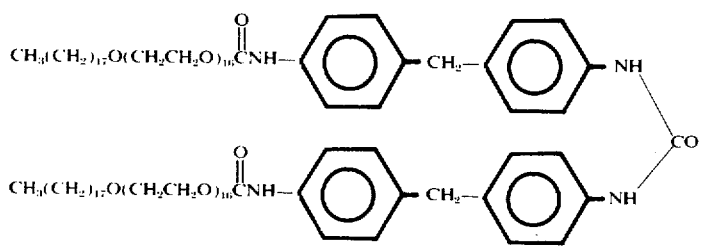

704 parts, by weight, ethylene oxide are added to 170 parts, by weight, stearyl alcohol in the presence of 4 parts, by weight, NaOH at 100°C as indicated under 1a. OH% = 1.74.

After treatment with 60 parts, by weight, acetic acid and removal of excess acetic acid under vacuum, 250 parts, by weight, 4,4'-diphenylmethane-diisocyanate are added to the melt at 100°C. The temperature is maintained at 130°C for 10 hours. A mixture of 50 parts, by volume, DMF and 30 parts, by volume, water is added dropwise to the solution after the addition of 2000 parts, by volume, DMF. The mixture is then stirred for 7 hours at 150°C.

b. Production and examination of polyacrylic fibre.

The solution from Example 3a is used to prepare a 29% dimethylformamide solution consisting of a mixture of 92.5 parts, by weight, of an acrylonitrile copolymer which has the composition indicated in Example 1b and a K-value of 82, and 7.5 parts, by weight, of the polyethylene oxide diurethane urea. The viscosity is approximately 80 ball-falling-seconds at 80°C. Thickness of the fibre: 3.3 dtex.

The electrical surface resistance of the fibre was determined at 23°C and 50% relative humidity. Sample after 10 washings: 6 × 10$^9$ Ω. After dyeing and 3 washings: 2 × 10$^9$ Ω.

EXAMPLE 4 a. Preparation of

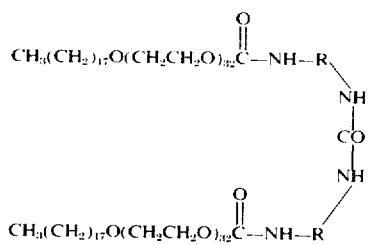

wherein R =

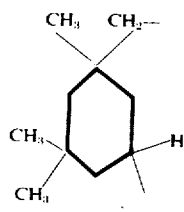

In a similar way to that indicated in Example 1a 270 parts, by weight, stearyl alcohol and 4 parts, by weight, NaOH solid are introduced into a reaction vessel and 1400 parts, by weight, ethylene oxide are introduced into the melt at about 100°C and absorbed (OH % = 1.01). After treatment with acetic acid and concentration by evaporation under vacuum, 841 parts, by weight, of this product are mixed with 111 parts, by weight, 3-isocyanatomethyl-3,-5,5-trimethylcyclohexane isocyanate at 100°C. The mixture is then stirred for 8 hours at from 120°to 130°C. 1000 parts, by volume, DMF are then added. 50 parts, by volume, DMF and 14 parts, by volume, water are then introduced dropwise. The reaction mixture is then stirred for 7 hours at from 140°to 150°C to form the corresponding urea.

b. Production and examination of the polyacrylic fibre.

The solution from Example 4a is used to prepare a 29% dimethylformamide solution which consists of a mixture of 92.5%, by weight, of an acrylonitrile copolymer which has the composition indicated in Example 1b and a K-value of 81, and 7.5%, by weight, of the polyethylene oxide diurethane urea. The viscosity determined by the falling ball method: from 75 to 80 ball-falling-seconds at 80°C. The solution is dry-spun.

Thickness of the fibre: 3.3 dtex.

The antielectrostatic effect of the additive is determined by measuring the electrical surface resistance of the fibre at 23°C and 50% relative humidity. Sample after 10 washings: 5× $10^9$ Ω.

After dyeing and 3 washings: 1 × $10^9$ Ω.

EXAMPLE 5 a. Preparation of

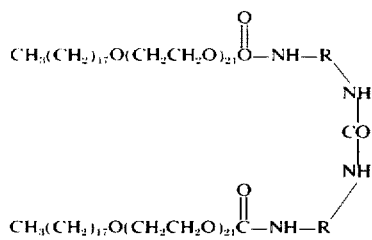

wherein R =

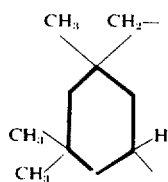

The ethoxylation of stearyl alcohol is carried out as described in Example 2a. 111 parts, by weight, 3-isocyanatomethyl-3,5,5-trimethyl-cyclohexane isocyanate are added dropwise to 601 parts, by weight, of the ethoxylated stearyl alcohol at 100°C. The reaction mixture is then stirred for 10 hours at about 130°C. The melt is then taken up in 1000 parts, by volume, DMF and a mixture of 50 parts, by volume, DMF and 12.5 parts, by volume, water is introduced dropwise. The reaction mixture is then stirred for a further 7 hours at from 140° to 150°C.

b. Production and examination of polyacrylic fibres.

The solution from Example 5a is used to prepare a 29% dimethylformamide solution which consists of a mixture of 90 parts, by weight, of an acrylonitrile copolymer which has the composition indicated in Example 1b and a K-value of 85, and 10 parts, by weight of the additive. The viscosity of the spinning solution is determined as being from 75 to 80 ball-falling-seconds at 80°C, using the falling ball method. The fibre is spun dry.

Thickness of fibre: 3.3 dtex.

The electrical surface resistance of the fibre is determined at 23°C and 50% relative humidity. After 10 washings: 7 × $10^9$ Ω.

After dyeing and 3 washings: 3 × $10^9$ Ω.

EXAMPLE 6 a. Preparation of

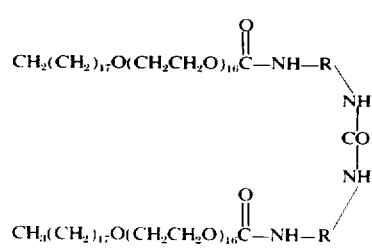

wherein R =

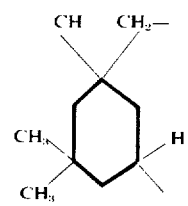

Stearyl alcohol is reacted with ethylene oxide as indicated in Example 3a. 56 parts, by weight, 3-isocyanatomethyl-3,5,5-trimethylcyclohexane is isocyanate are added to 245 parts, by weight, of the ethoxylated product at about 100°C and the mixture is heated to 130°C for 8 hours. After the addition of 500 parts, by volume, DMF a mixture of 50 parts, by volume, DMF and 7 parts, by volume, water is introduced dropwise and the reaction mixture is then stirred for 7 hours at 150°C.

b. Production and examination of the polyacrylonitrile fibres.

The solution from Example 6a is used to prepare a 29% dimethylformamide solution which is composed of a mixture of 90% by weight, of acrylonitrile copolymer having the composition indicated in Example 1b and a K-value of 80, and 10% by weight, of the additive prepared under 6a. The solution, which has a viscosity of from 75 to 80 ball-falling-seconds at 80°C. (determined by the falling ball method), is spun dry.

Thickness of fibre: 3.3 dtex

The electrical surface resistance of the fibre is determined at 23°C and 50% relative humidity.

Sample after 10 washings: 1 × $10^{10}$ Ω.

After dyeing and 3 washings: 7 × $10^9$ Ω.

I claim:

1. A shaped structure of an acrylonitrile polymer consisting of from 85 to 99.5%, by weight, of polyacrylonitrile or an acrylonitrile copolymer containing at least 60% of copolymerised acrylonitrile comprising as an antistatic additive from 0.5 to 15%, by weight, of a polyether diurethane urea compound of the following general formula I

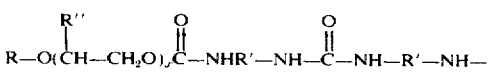

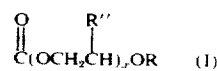 (1)

wherein

R denotes a $C_8$ - $C_{18}$-alkyl, cycloalkyl, aryl, aralkyl or alkaryl group, any of which may be substituted by halogen or alkyl;

$x$ denotes an integer of from 5 to 50;

R' denotes an alkylene, arylene, aralkylene, alkarylene or cycloalkylene group; and R" denotes hydrogen or a methyl group.

2. The shaped structure of claim 1, wherein in the general formula (I) the group R' represents

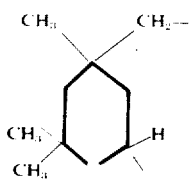

3. The shaped structure of claim 1, wherein in the general formula (I) the group R' represents

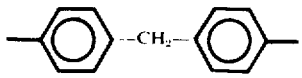

4. A process for the production of a shaped structure of an acrylonitrile polymer with antistatic additives which comprises addition of from 0.5 to 15%, by weight, (based on the polymer mixture), of a polyether diurethane urea compound corresponding to general formula I

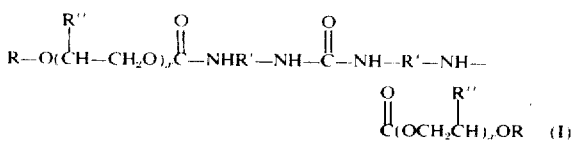

wherein
R denotes a $C_8$ - $C_{18}$-alkyl, cycloalkyl, aryl, aralkyl or alkaryl group, any of which groups may be substituted by halogen or alkyl;
$x$ denotes an integer of from 5 to 50;
R' denotes an alkylene, arylene, aralkylene, alkarylene or cycloalkylene group; and
R'' denotes hydrogen or a methyl group;
to the solution of said acrylonitrile polymer in an organic solvent and removal of said solvent in a shaping operation.

* * * * *